Feb. 14, 1967 M. R. GEROW 3,304,352
METHOD FOR THE EXTRUSION OF TUBING
Filed April 8, 1963 3 Sheets-Sheet 1
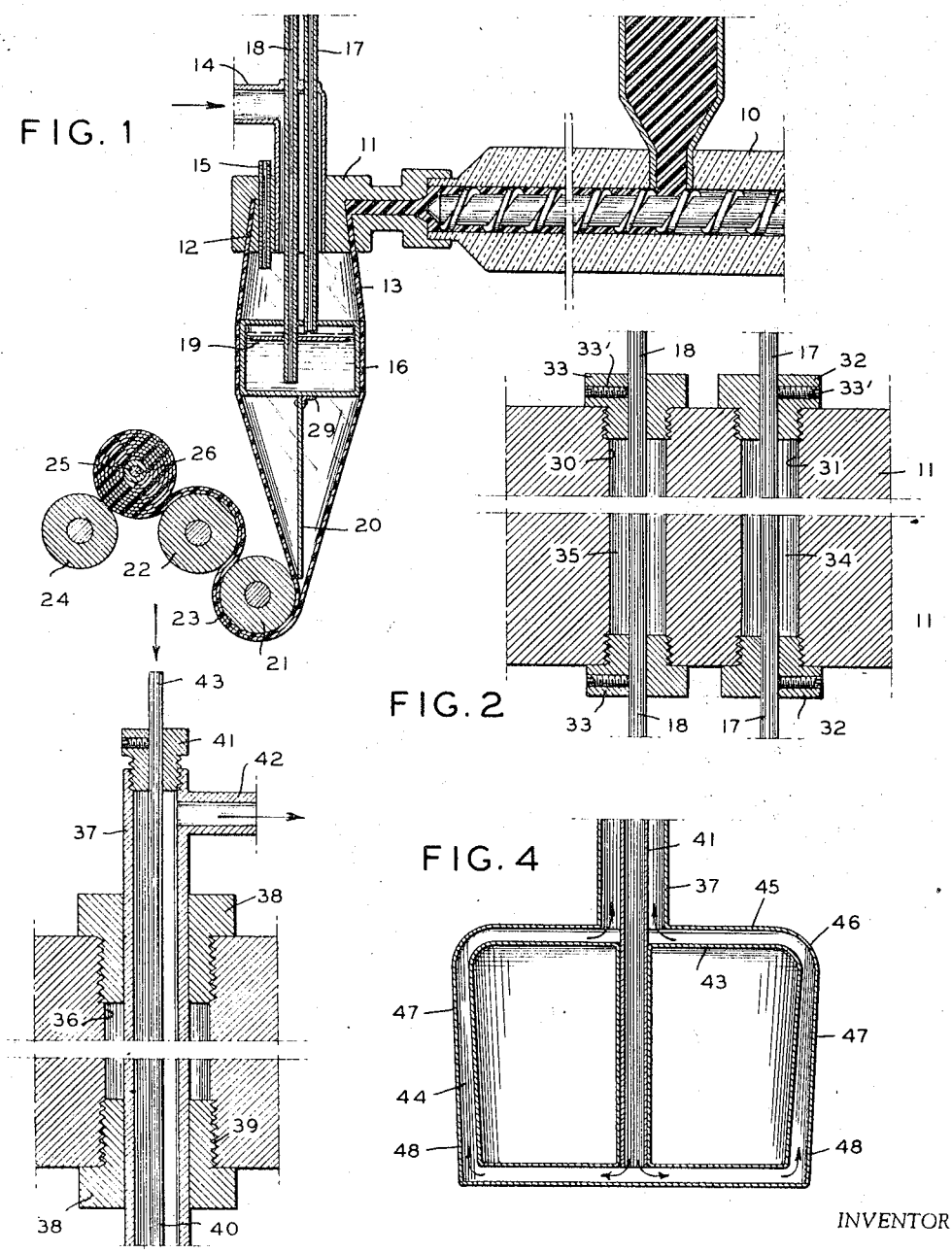
INVENTOR
MILO R. GEROW
BY Sol Shappiro
ATTORNEY

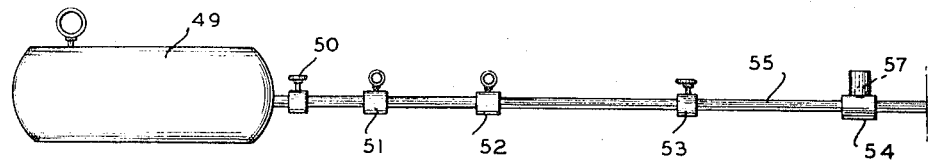
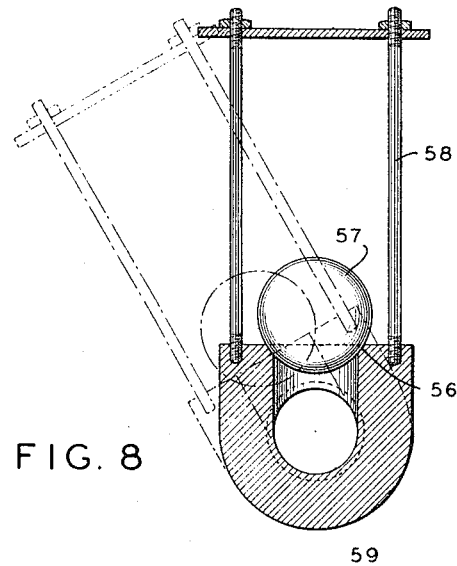
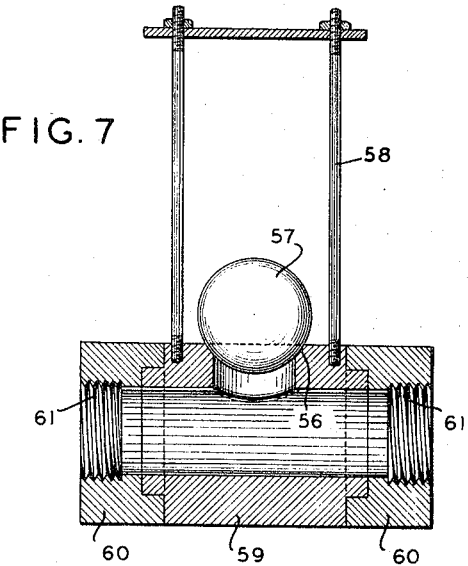
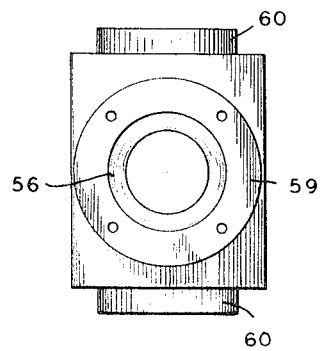
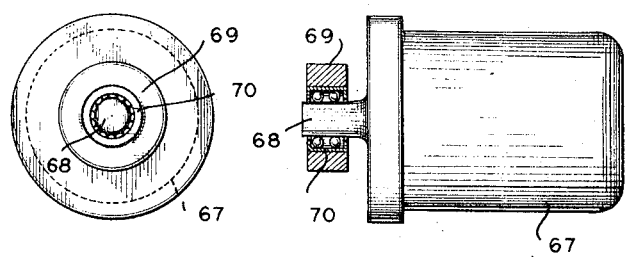
INVENTOR
MILO R. GEROW
BY Sol Shappirio
ATTORNEY Feb. 14, 1967   M. R. GEROW   3,304,352
METHOD FOR THE EXTRUSION OF TUBING
Filed April 8, 1963   3 Sheets-Sheet 3
FIG. 9
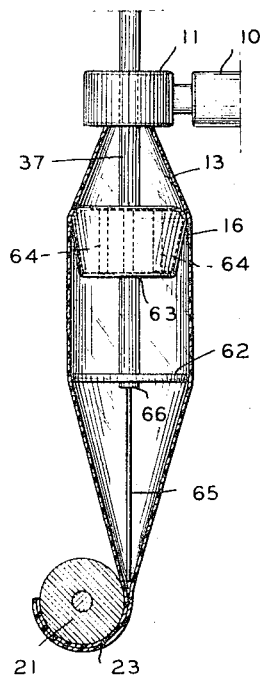
FIG. 10
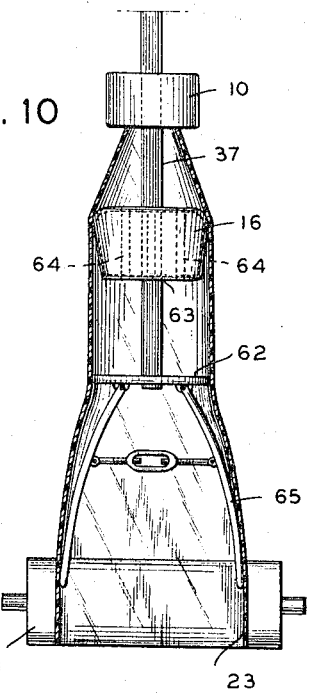
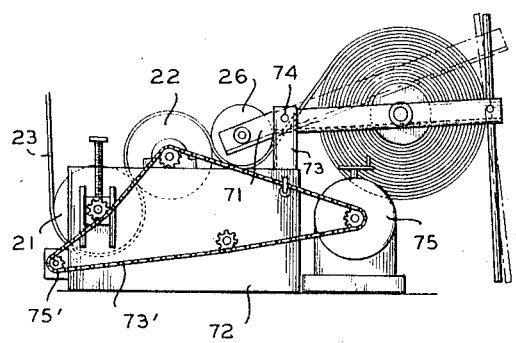
FIG. 11
FIG. 12
INVENTOR
MILO R. GEROW
BY Sol Shappirio
ATTORNEY United States Patent Office 3,304,352
Patented Feb. 14, 1967

3,304,352
METHOD FOR THE EXTRUSION OF TUBING
Milo Robert Gerow, 174 Laurel Hill Road,
Mountain Lakes, N.J. 07046
Filed Apr. 8, 1963, Ser. No. 271,244
3 Claims. (Cl. 264—95)

This application is a continuation-in-part of application Serial No. 540,718, filed October 17, 1955, now Patent No. 3,084,386 granted April 9, 1963.

This invention relates to methods for the manufacture of extruded synthetic resinous thermoplastic products in which the manufacture is facilitated and supervision reduced to a minimum while obtaining greatly improved products of wide utility.

Many prior art operations have been suggested for the manufacture of such thermoplastic tubing and sheeting. Calendering most commonly used today requires expensive installations at a cost of between $500,000 and $750,000. The operation entails services of six to eight men. Steam is required in large volume and relatively high temperature (at least 375° F.). Limitations and deficiencies in calender produced products include:

(1) Minimum gauge 3 mil—some down to 2 mil.
 (2) Poor physical properties—Tensile—2300; Tear—250; Elongation—High.
 (3) High plasticizer ratio required for example 50 to 70 parts per 100 parts of vinyl resin. Consequently all calender film, if produced from smooth polished rolls, would block, and therefore the rolls on the calenders are matted, etched or frosted to produce a film with matted finish.
 (4) Poor gauge control—.001″ for 3 mil and 4 mil stock.

Since calenders are never able to really melt the compound, but only handle it in the formative mastic state, they are unable to obtain low gauge, transparent films or films with high physical characteristics. (The term "formative mastic state" is used herein to define that state of the plastic wherein the plastic is in the soft unset or partly set condition and can be permanently enlarged as by stretching.) In 1953, calendering accounted for most of the vinyl film produced in the United States despite the considerations set forth above. Good quality product in 3 to 4 mil gauge costs about 60¢ per lb.

Casting operations to produce sheet thermoplastic requires installations costing about $50,000. Highly plasticized compositions are required e.g. 40 parts plasticizer to 100 parts resin, the composition being cast on endless bands of stainless steel or specially treated paper. Five men are usually required to handle the operation.

The limitations on casting operations include the following:

(1) Lowest gauge—1 mil.
 (2) Bad gauge variation.
 (3) High cost due to solvent loss.
 (4) Paper web cannot produce transparent film in prior art processes.

Cast film sells for about 75¢ to $1.30 per lb. depending on gauge (1 mil $1.00 per lb.). The physical properties are generally better than those of calendered film e.g.

Tensile, p.s.i. _____ 2000 to 8000
Tear, Elmendorf gms. _____ 10 to 1400
Elongation, percent _____ 2 to 350

Extrusion installations particularly for polythene are widely used, but only one manufacturer produces extruded polyvinyl tubing or sheeting. A production unit costs about $25,000 and is capable of producing lower gauge material than is calendering. Comparative physical properties are:

Tensile, p.s.i. _____ 3400 to 4400
Tear _____ 300 to 700
Elongation, as desired.

Greater flexibility is possible in formulation, gauge, and clarity and physical properties may be maintained even as gauge is lowered. Extruded film of the appearance of cellophane in 0.005 inch gauge sells at $1.00 to $1.50 per lb. Vinyl gives better shelf life than cellophane. The latter furthermore cannot be heat sealed but must be coated with a heat seal coating. Very thin gauge film (as low as 0.000125 inch gauge) may be produced.

However all prior art operations are relatively expensive, excessive labor costs are required, controls are difficult and frequently not feasible, tolerances are excessive, and reject material is very high.

Among the objects of the present invention is the production of very thin to relatively thick walled continuous synthetic resinous thermoplastic tubing which may be maintained as a tube or slit to produce sheeting, by relatively low cost machines and operations, requiring a minimum of labor, giving smooth operation, close tolerance control, and generally improved products of high quality at materially reduced cost of manufacture.

Other objects include methods for such production, giving products free from wrinkle, tracking, and sideslip.

Other and further objects of the present invention will appear from the more detailed description set forth below, it being understood that such more detained description is given by way of illustration and explanation only and not by way of limitation, since various changes therein may be made by those skilled in the art without departing from the scope or spirit of the present invention.

In connection with that more detailed disclosure, the drawings illustrate the following:

FIGURE 1 is a side elevation of apparatus generally shown, for extrusion and processing.

FIGURE 2 is a fragmentary sectional view of a detail of the apparatus of FIGURE 1.

FIGURE 3 is a similar view of a modified form.

FIGURE 4 illustrates in cross-section a temperature-modifying former for extruded tubing.

FIGURE 5 is a side elevation of a pressure fluid supply line with pressure reduction device.

FIGURE 6 is a top plan view of the valve seat for the relief valve of FIGURE 5.

FIGURE 7 is a vertical section of a relief valve unit.

FIGURE 8 is a vertical transverse section of the relief valve unit.

FIGURE 9 is a side elevation partly in section of apparatus for making tubing.

FIGURE 10 is a front elevation thereof.

FIGURE 11 is a side elevation of a rewind machine desirably used.

FIGURE 12 is a top plan view thereof.

FIGURE 13 is a detail of a plug used in the core on the rewind machine.

FIGURE 14 is an end view thereof.

In accordance with the present invention, extrusion of a synthetic resinous thermoplastic material is carried out to produce tubing of predetermined diameter and the tubing is set or at least partially set at the exact point where the tubing has reached the desired final diameter. All operations at all stages from the initial extrusion zone to the final wind-up of finished product are carefully controlled in order to insure the accomplishments of the objects of the invention. Thus care is taken that fluids passed through passages in the extrusion die to support the tubing while in extruded non-self-sustaining condition or passed through passages in the die to act as coolant for the tubing as it passes over a former in the setting stage, should be transmitted through the die in pipes which do not contact the walls of the die, since such contact may result in spot cooling and produce gel or reduce flow or even lack of flow having deleterious effect on the ultimate product obtained. Consequently it is desirable to use pipes or other conduits for conveyance of such fluids, and to space such pipes from the walls of the die forming passages for such pipes or conduits as by centering devices. Further since the former is supported from the die itself within the tubing being extruded, and the position of the former with respect to the die is controlled to affect the characteristics of the extruded product depending on the nature of the thermoplastic and the conditions of operation, the centering devices may be positioned by means of set screws or in any other desired way in order to vary the length of pipes or conduits between die and former for the purposes set forth. These features may be utilized whether the fluid carrying pipes or conduits are separate or concentric. The distance from die to former will usually not be more than 15 or 20 inches. If much longer it is necessary to maintain the molten plastic in proper condition by protection against loss of heat.

Another feature that has been found important in actual practice, resides in the nature of the surface over which an extruded thermoplastic in non-self-sustaining condition is passed to be size-controlled and at least partially set. In the present invention this consideration particularly applies to the temperature-modifying former over which the extruded tubing travels. Passage of the extruded tubing over the former, if the latter is a smooth metal surface, brings two smooth surfaces into intimate contact and permits polyethylene for example to cling or adhere to the former surface so that there is considerable draw on the former. This is particularly true in those cases like polyethylene, where refrigerated water or water below about 45° F. is desirably used to obtain high speed production. To eliminate such draw or cling, it is found desirable to relieve the surface of the former as by roughening. Thus the surface may be sanded, for example by rubbing with 400 sandpaper to scratch the surface to eliminate substantially draw or cling. Since lines at an angle tend to turn plastic passing thereover to give a skew effect, if the latter is not desired, the surface may be sand blasted or vapor blasted or lined with a knurled effect to give an excellent result. In any case, the roughened surface may be metal-plated as with chrominum to eliminate wear without destruction of the desired roughened effect.

Usually the surface of the former facing the extrusion zone is at a transverse angle to the direction of travel of the extruded tubing so that the latter causes a sharp change in angular movement of the plastic. While in some cases this will give rise to little difficulty, in others as with polyethylene where the material is soft, and stretches easily, the result is not desirable. Accordingly, it has been found preferable in such cases to have such surface arcuate, the upper end of the arc having a radius such that the angle is within the angle of incidence of the plastic with respect to the former surface. The larger the former, the more desirable it is to preserve this angular relation.

In keeping with other considerations as to heat control and transfer in order to produce the best possible products with minimum manual manipulation during operation, the temperature modifying effect, such as cooling, sought by the temperature-modifying former, should be as uniform as possible. For this purpose rapid flow of temperature modifying medium is best carried out and to secure the best conditions for such purposes, the cooling or other temperature modifying chamber should be small and permit rapid circulation of medium. The best results for such purposes have been obtained by using a baffle within the former which substantially follows the contour of the outer walls of the former, the former having inlet and outlet pipes for the temperature-modifying medium circulated therein. The lateral walls of the former along which the plastic travels and is converted to at least partially set condition, desirably taper inwardly in the direction of travel of plastic, to compensate for shrinkage of the tubing.

Since the plastic is extruded in non-self-sustaining condition, it is supported internally by fluid under superatmospheric pressure introduced into the tubing between the extrusion zone and the former. The super atmospheric pressure should be such as to produce no substantial surge, and hence critical control of the pressure of the fluid is desirable. While fluid such as air may be reduced down in pressure by reduction valves in stages, for example of 20# gauge, 10# gauge, and finally through a ⅛" needle valve, it is most desirable to utilize a relief valve in the line between the last reduction stage and the die to insure the critical control of pressure necessary to insure its maintenance when desired within very narrow limits. This is accomplished in the present invention by a relief valve including a seat and ball valve carried in said seat responsive to slight fluctuation in pressure. Generally the seat will be circular, and any valve having a circular cross-section, may be used. Thus the valve may be spherical, conical, etc. Actually very careful pressure control has been maintained within relatively narrow limits at low pressure values by utilizing a Ping-pong ball as a valve. Further sensitivity may be obtained by making the valve seat variable in angular position with respect to the horizontal, whereby the weight component against the valve seat may be varied with a given value.

A further feature desirably utilized in the present invention utilizes a structure to insure that the tubing being drawn from the former is drawn forwardly with a substantially uniform pull around the periphery of the tubing. Unless provision is made for this purpose, it has been found in actual operation that there is a tendency for the pull on the tubing to vary at different points in the periphery passing over the former. To eliminate substantially any such variation in pull, an after-baffle or disc may be used supported from the former within the tubing in the direction of draw. The baffle is given a contour of the same character as and size as that of the former at its maximum width. Such a baffle insures that the pull in all vertical points around the periphery will be substantially uniform. Such baffle also causes a balanced air pressure in the tubing between the baffle and the former. In order to avoid frictional resistance as much as possible, the edges of the baffle are desirably coated as for example with "Teflon." Utilization of an after-baffle in this way is desirable for other reasons. Thus it insures that the tubing in cross-section is truly circular for the following flattening or gussetting operation.

To maintain balanced fluid pressures in the tubing, it has been found desirable to provide passages in the former to permit pressure self-adjustment between the extrusion zone and the former with that between the former and the after-baffle.

The rewind operation by which the product formed such as tubing or sheeting is delivered to and wound on a wind-up roll is also of consequence in obtaining the best wind-up operation and resulting product. In the usual wind-up operation heretofore employed, the final flattened plastic product whether flattened tubing or sheeting has been rather tightly or "hard" wound to an undesirable extent since most films shrink at least 4% (polyethylene) to over 10% (vinyl) after winding. To obtain a softer roll, the present invention provides a wind-up operation in which slippage is provided for during wind-up, to permit a variation of weight as against slip at the point of rewind. Also to avoid wrinkle and other undesirable effects, the flattened plastic product at all times during wind-up is in continuous surface contact with the take-up rolls and wind-up roll in unrelaxed and unwrinkled condition.

By the utilization of the operations as set forth above, extruded products of the highest quality are obtained by exceedingly economical machines and operations with minimum labor requirements.

Machines and apparatus to effect such operations are illustrated in the drawings. While one or more of the illustrated operations may be utilized without the others, the maximum results are obtained by utilization of all of them in the operation.

Turning to a consideration of the machines and devices shown in the drawings, the following is noted. Referring to the general schematic showing in FIGURE 1, extruder 10 which may be jacketed for a temperature control medium in the usual way, delivers thermoplastic material to die 11 from which it is extruded through orifice 12 in molten or semi-molten condition as tubing 13 in non-self-sustaining condition. Passage or conduit 14 in die 11 is connected to any desired air supply such air or other fluid under superatmospheric pressure entering tubing 13 interiorly thereof to support the tubing against collapse, circulating therein to, and out of vent 15. Adjustment of the air supply may be utilized to compensate for loss of air by leakage or otherwise.

Tubing 13 is drawn downwardly as illustrated (though it may be drawn in any desired direction) and passes exteriorly over temperature-modifying former 16. Usually former 16 is supplied with a cooling medium, through inlet pipe 17 circulating in former 16 and exiting through pipe 18, pipes 17 and 18 extending through die 11. Baffle 19 interiorly of former 16 directs circulation medium in former 16. Pipes 17 and 18 may be used to position former 16 at the desired distance from die 11. The cooling of thermoplastic as it passes over former 16 sets tubing 13 at any desired point in its travel over former 16. Thereafter the tubing is not subjected to any further expansion during the remainder of its travel. It is set or at least partially set in size and contour.

Tubing 13 passes from former 16 over spreader 20 attached to former 16 as at 29, and collapses tubing 13 into a flattened tube which is drawn forward by draw rolls 21 and 22, these rolls serving to eliminate any air bubbles in flattened tubing 23. The latter leaves spreader 20 in flattened form and contacts the first draw-roll 21 at a point approximated at the center of roll 21 and thereby maintains contact with roll 21 for over one-half of the periphery of roll 21. Tube 23 then passes between rolls 21 and 22, any remaining air bubbles are evacuated, and tubing 23 passes to rewind rolls 24 and 25. The flattened tube 23 contacts the surfaces of the rolls and of core 26 on which it is wound under conditions where tube 26 is in substantially continuous surface contact with the several rolls and core from the time that such tube 23 leaves spreader 20 until it is wound on core 26. Such continuous surface support of tube 23 is maintained at all times in unrelaxed and unwrinkled condition. In this way there is no opportunity for tube 23 to be unsupported at any point and consequently there is no formation of wrinkle or other distortion in flat tube 23. This result is of great importance in industrial operation giving a product free from such defects. The operations are equally applicable to produce wound sheeting formed by slitting the tubing 13 following its withdrawal from former 16, the slitting being carried out by conventional knife means (not shown) but the wind-up operation being conducted on the sheeting in the same way as for flattened tube 23 as described above.

The supporting fluid such as air introduced through inlet 14 and vented at 15 supports the tubing 13 while in the formative mastic state during its progress to former 16. Once the amount of air is established as to volume and pressure for any particular operation, the valves may be set in a given position to maintain such conditions. While tubing 13 passes over former 16, heat transfer takes place on the entire interior surface of tubing during exposure to the surface of former 16. The quantity of coolant in former 16, its temperature and pressure, and the manner of its circulation are such that the thermoplastic material is converted from the formative mastic state to a set or partially set condition at a time when the tubing has reached a predetermined desired diameter which may be in the vicinity of the bottom of former 16.

The position of former 16 with respect to die 11 is fixed by the time desired for the plastic to reach the desired set condition in its passage over former 16. After the final diameter or size or contour is obtained, there is no substantial further change in such dimension or shape. It is more desirable to obtain the expansion of tubing 13 to predetermined diameter in the vicinity of die 11, but there is no necessary limitation in this direction. Former 16 may be positioned at any desired distance from die 11, and such position will determine the length of draw. By increasing such distance of draw, tubing will be capable of longer draw in the machine direction, thereby enhancing its physical properties in that direction. Tubing will thus be capable of further drawing because of the longer time element and distance while in the formative mastic state. Draw by rolls 21 and 22 also results in tubing 13 acquiring a machine-drawn linear expansion as it is pulled forward, the wall of the tubing becoming thinner and thinner as it is drawn toward former 16. Tubing 13 thus reaches its least (and final) thickness just on contacting former 16. The result is that former 16 determines the final diameter and contour of tubing 13 when it reaches that point where it is thinnest.

The quantity of temperature modifying medium such as cooling water which is circulated in former 16 depends in part on the distance of the former between die 11 and draw-rolls 21 and 22. The variables controlling these considerations include Speed of travel of extruded tubing;
Temperature of coolant;
Room temperature;
Temperature of extruded material;
Specific heat of the thermoplastic;
Die orifice.

From these considerations, it is apparent that various factors including internal air pressure and volume, volume of coolant introduced into the former, the temperature of the die, the speed of the draw-rolls, etc., may all be balanced against each other to produce tubing and sheeting of predetermined characteristics.

In the manufacture of thermoplastic tubing and sheeting by this invention, various dimensions and properties of the finished tubing and sheeting are capable of variation and control including:

(1) Flat width of tubing and sheeting.
(2) Thickness of tubing and sheeting.
(3) Machine-direction properties: structural characteristics of tubing and sheeting (i.e. tear resistance, tensile-strength, etc.).
(4) Transverse-direction properties: structural characteristics of tubing and sheeting (i.e. tear resistance, tensile strength, etc).
(5) Clarity mainly due to individual characteristics of the thermoplastic affected.

For the production of the best quality of product in continuous processes requiring a minimum of supervision, a variety of factors are important. The following features are particularly important, each contributing a particular feature of control. While any one or more of them may be utilized, the conjoint utilization of all of them gives the most desirable results.

FIGURE 2 represents a structure whereby fluids introduced to the tubing being extruded for support thereof or to the former for temperature-control are utilized under conditions to give minimum interference with the heated thermoplastic in the die. As there shown pipes 17 and 18 are centered in channels 30, 31 of die 11 by centering elements 32, 33 respectively so that each pipe is held in the respective passages with a surrounding air space 34, 35. Set screws 33' enable the position of pipes 17 and 18 to be varied so that such pipes which hold former 16 at the desired distance from die 11 may be adjusted for purposes described above.

While FIGURE 2 shows separate pipes for this purpose, concentric pipes may be used. As shown in FIGURE 3, die 11 has passage 36 through which pipe 37 passes and is centered in passage 36 by centering elements 38 which may be threaded at 39 into passage 36 and set screws may be used as shown in FIGURE 2. Concentric pipe 40 passes through pipe 37 in which it is centered by centering elements 41, threadedly seated in pipe 37, set screws also being used to hold the pipes in position. Pipe 37 has a conduit 42 while access to pipe 41 is from its end 43. While fluid for any particular purpose may circulate in either direction through pipes 37 and 41, more desirably when a cooling medium is used, the latter is introduced through inner pipe 41 and exits through outer pipe 37 so that the somewhat warmed-up fluid acts as a further blanket between the cooler fluid and the warmer die in addition to air space in passage 36. The concentric pipe arrangement may be used to position former 16 at the distance desired from die 11 as shown in FIGURES 9 and 10.

Referring now to FIGURE 4 for features of control through the former, inlet pipe 41 conducts cooling fluid, for example, into hallow former 16 from which it exits through pipe 37. In order to obtain better cooling control, it has been found desirable to utilize in lieu of baffle 19, of FIGURE 1, internal baffle 43 (FIGURE 4) which generally follows the contour of former 16 to produce a small internal cooling chamber 44. To reduce weight, baffle 43 is hollow and similar in shape to hollow former 16. This construction gives good flow and very even cooling at all points, and eliminates cross-currents.

Since the extruded tubing in non-self-sustaining condition first meets upper wall 45 of former 16, it has been found desirable with some thermoplastics at least, to make such upper wall 45 arcuate as shown at 46, and desirably the radius of curvature is less than that of the angle of incidence of thermoplastic to wall 45. The larger the former, the more important is it to utilize this expedient for best control because the angles of incidence flattens.

As pointed out above, outer walls of former 16 in contact with non-self-sustaining plastic tubing 13 are desirably roughened. Thus in FIGURE 4, so much of upper wall 45, of arcuate wall 46 and of dependent wall 47 may be vapor blasted or otherwise roughened for this purpose and metal-plated to reduce wear on the roughened surface without destruction of the roughened surface. Dependent side walls 47 desirably taper inwardly at 48 in the direction of travel. The amount of taper will vary with the thermoplastic being utilized. It should be sufficient to accommodate for shrinkage of thermoplastic, but actually as will be apparent from considerations given below, the extruded tubing, once it has been set or at least partially set, need not contact dependent walls 47 up to the lowermost edge of former 16.

It has been pointed out above that control of pressure of fluid introduced into tubing 13 being extruded in non-self-sustaining condition to support such tubing, is of great importance in controlling characteristics of the tubing and sheeting and particularly in maintenance of close tolerance particularly desirable in very thin-walled extrusions such as 1 mil, more or less. For these purposes, the structures of FIGURES 5 to 8 may be utilized. Fluid usually air from tank 49 passes outlet volve 50 through several reducing stages as for example a 20# gauge stage 51, a 10# gauge stage 52 and finally through needle valve 53 which may conveniently be a 1/8" valve. Relief valve 54 is desirably inserted in line 55 which conducts fluid to support non-self-sustaining tubing 13. Such relief valve may be of any desired type, but since fluid is desirably used in the present invention at relatively low pressures for support only and not for expanding, and at pressures where no surge is obtained, pressure control between narrow limits is desirable. For such purposes, valve seat 56 provides a seat for valve 57 which desirably may be a Ping-pong ball. Delicate response to variation in pressure is thus obtained. While a spherical valve is thus indicated, the valve and valve seat may be of any desired shape for the purposes in hand. To obtain still finer adjustment, the valve may be mounted in cage 58 on pipe section 59 journaled in sections 60, the latter being threaded at 61 for attachment in line 55. The valve may thus be a unitary structure to be positioned where desired. The journaled structure just described enables the cage and valve to be tilted sidewise, as shown in FIGURE 8, to vary the effective weight component of valve 57 downwardly against valve seat 56. Very careful control of pressure is thus obtainable. If the flow or pressure tends to rise, the ball relieves the pressure by rising from the seat, and on the other hand, if there is a reduction in pressure, the ball closes the valve until normal conditions are reasserted.

In the present invention one noteworthy feature resides in the short distances of travel of thermoplastic which may be used to accomplish the desired results. In flattening tubing 13 as it passes from former 16 over spreader 20, it has been found that, particularly as tubing size is increased, there is a tendency for the pull on the former to vary at different points around its periphery. Those portions of tubing being creased to produce flattening tend to relieve the pull on their portions of tubing, while relatively greater pull is exerted at other sides. To eliminate such condition it has been found desirable to use after-baffle 62 (FIGURES 9 and 10) placed below former 16 to which it is attached as at 63. After-baffle 62 assures that the pull along all sides of former 16 will be substantially uniform, and in a vertical direction at all times. After-baffle has a contour conforming with former 16 at its widest point, and of the same size, to obtain the desirable effect described. After-baffle 62 thus serves to seal tubing 13 substantially against loss of fluid in the direction of travel. After-baffle 62 may be coated as by "Teflon" to reduce frictional contact with the tubing passing thereover.

After-baffle 62 also causes a balanced air pressure between it and the former and in order to keep such pressure substantially the same as that between former 16 and die 11, former 16 may be provided with one or more passages 64 connecting the space between after-baffle 62 and former 16 with the space between former 16 and die 11. This condition is preferably in keeping the tubing in substantially a true circle for the flattening and gussetting operation when the latter is used as conventionally applied. Spreader 65 attached at 66 to after-baffle 62 may be used to flatten tubing 13 into flattened tube 23 for wind-up.

The rewind operation has caused a great deal of difficulties in processes utilized in the art prior to the present and related inventions. The prior art product obtained was not only of variable gauge and exhibited various other defects and imperfections, but particularly in thin-walled material was subject to wrinkling and other defects occurring during the rewind operation. Further very tight rolls resulted from shrinkage of the plastic after it was wound on a core.

All of the prior art difficulties are now overcome and a contributing factor in this connection is the rewind operation utilized herein. For these purposes the tubing in its final condition as flattened tube 23 (or as sheet if tubing is slit to form sheeting) is delivered from spreader 65 to the wind-up zone. Here the wind-up roll is not directly driven, but instead freely revolves in rolling contact with a driven take-off roll whereby slippage is permitted sufficient to give a soft wound roll that compensates for after-shrinkage. As shown in FIGURES 11–14, take-up rolls 21, 22 receive flattened tubing 23 which passes over and between the rolls to deliver to wind-up roll 26. Roll 26 has free rolling contact with take-up roll 22 from which it receives tube 23. For this purpose roll 26 is composed of a core 25 carrying a plug 67 in each end. Each plug 67 carries a shaft 68 on which roller 69 is mounted on ball bearing 70. Core 25 carrying a plug on each end is placed on a pair of tracks 71 one on each side of the wind-up machine 72, and spaced apart to receive core 25 with a plug positioned to run in each track. Tracks 71 are mounted for pivotal movement on frame 73 at pivot point 74 so that the angle of the tracks may be adjusted. The weight of the core and plugs can be either shifted to rubber take-up roll 22 or to the ball bearings on the tracks. As the weight is shifted to the tracks away from rubber take-up roll 22, a greater amount of slippage occurs which permits a softer roll to be wound. Once the desired position is established for a particular tube or sheeting being produced, the position is fixed for that operation.

Tube 23 is taken up by take-up rolls 21, 22 and delivered to wind-up rolls with the tubing in substantially continuous surface contact with the rolls and core so that it is at all times in unrelaxed and unwrinkled condition. In this way the tube or sheet is never permitted to be unsupported or suspended in air so that there is no opportunity for it to relax or to wrinkle, regardless of how thin-walled it may be. The support of core 26 in the manner shown eliminates side-sway. Rolls 21, 22 may be driven by chain 73' from motor 75 using multi-speed control 75'.

Any extrudable synthetic resinous thermoplastic material may be handled in accordance with the present invention. Such usable materials include polyethylene, polyvinyls, and vinyl copolymers, cellulose esters and ethers such as cellulose acetate, cellulose acetate-butyrate, ethyl cellulose, benzyl cellulose, nylon-type resins etc.

The following examples illustrate the invention.

*Example 1*

This illustrates the production of tubing 7" flat width and 0.002" in (wall) thickness, whose tensile strength in the machine direction is approximately equal to its tensile strength in the transverse direction, and whose tear resistance in the machine direction is approximately equal to its tear resistance in the transverse direction.

Molten polyvinyl chloride compound was extruded in an apparatus shown in FIGURE 9 at the rate of 12 pounds per hour through a die having an annular orifice of 0.030" and 4" in diameter (between the outer lips thereof), the temperature of the vinyl chloride at the lips being 330–350° F. The extruded tubing was withdrawn downward in a vertical direction from the die at a rate of 15 feet per minute by the pull rolls positioned 2 feet below the die. Sufficient air necessary to support and separate the tubing while in the formative mastic state to feed the tubing to the cooling former of a fixed diameter of 4½", to produce a final tube diameter of 4¼" which, upon flattening, will produce a flat width of 7", was continuously introduced internally of the tubing through the air inlet 14 and vented through vent 15. The tubing was drawn over the former 16 of fixed diameter with a 0.040" taper, the former being in close proximity to the die approximately a distance equal to the diameter of the former 16. The tubing was chilled and set as it was drawn over the former 16 which thus prevented further expansion of the tube. The tubing which was drawn to its ultimate diameter as it was drawn over the former edge reached its final diameter before leaving the former.

After the tubing had passed the cooling former, it passed through an unconfined circumambient atmosphere which, in this example was the atmosphere of the room, over the spreader to the pull rolls and rewind.

*Example 2*

This example illustrates production of a tubing 7" in flat width and 0.002" in (wall) thickness whose tensile strength in the machine direction is higher than the tensile strength in the transverse direction and whose tear resistance in the transverse direction is greater than its tear strength in the machine direction.

The procedure and condition are the same as those described in Example 1, except that temperature of the coolant in the former was higher (between about 90 and 110° F.), obtained by decreasing the flow of the coolant.

The higher temperature of the cooling former did not wholly set the extruded tubing but only a part (surface only) thereof. Thus, the tubing was still in the formative plastic state and capable of further drawing even though some cooling had taken place.

All things being equal, a tubing in the formative plastic state tends to be drawn if restricted by flow at any point. As the tubing was being drawn by the pull rolls, it was acquiring a machine direction linear expansion, the film becoming thinner and thinner as it was drawn over the cooling former until it reached a setting point of cooling near the bottom of the former 16. The film reached its least (and final) thickness just before leaving the contact with the spreader, the diameter being predetermined.

*Example 3*

This example illustrates production of a tubing 7" in flat width and a 0.002" (wall) thickness whose tensile strength in the machine direction is higher than the tensile strength in the transverse direction and whose tear resistance in the machine direction is greater than its tear resistance in the transverse direction.

The procedure and conditions are the same as those described in Example 1, except that the cooling former 16 had a diameter of 10¼" to give a predetermined tube diameter of 18".

It is apparent that this procedure is substantially the method of Example 1 in all particulars except that, due to the utilization of a larger cooling former, the tubing is drawn in the transverse direction to a greater degree whereby the desired properties are obtained.

*Example 5*

This example illustrates the production of tubing 7" in flat width and 0.001" in (wall) thickness, whose tensile strength in the machine direction is greater than the tensile strength in the transverse direction, and whose tear resistance in the transverse direction is greater than its tear resistance in the machine direction.

Molten cellulose acetate compound was extruded in an apparatus as shown in FIGURE 9 at the rate of 15 pounds per hour through a die having an annular orifice of 0.030" and 4" in diameter (between the outer lips thereof), the temperature of the cellulose acetate at the lips being 330°–380° F. The extruded tubing was withdrawn downward in a vertical direction from the die at the rate of 29.7' per minute by the pull rolls positioned 2' below the die. Sufficient air necessary to support and separate the tubing while in the formative mastic state to feed the tubing to the cooling conductive former of a fixed diameter of 4½" to produce a final tube diameter of 4¼" which, upon flattening, will produce flat width of 7", was continuously introduced internally of the tubing through air inlet 14 and vented through vent 15, the tubing was drawn over the cooling former 16 of fixed diameter, with a 0.020" taper, which was positioned in close proximity to the die approximately a distance slightly greater than the diameter of the cooling former 16. The tubing was chilled and set as it was drawn over the former 16 which thus prevented further expansion of the tube. The tubing which was drawn to its ultimate diameter as it was drawn over the former edge, reached its final diameter before leaving the former 16. After the tubing had passed over the former, it passed through air unconfined circumbient atmosphere which, in this example was the atmosphere of the room, over the spreader to the pull rolls, through the pull rolls, and rewind.

Though the specific examples describe the invention in connection with the production of seamless tubing of predetermined desired characteristics from polyvinyl chloride, it is to be understood that the invention is not restricted thereto. In general, the invention can be utilized with any thermoplastic material and mixture of synthetic rubbers with thermoplastic materials. Each thermoplastic substance or composition possesses certain properties which may make it necessary to determine, by experiment, the extent that the variables have to be balanced in order to produce tubing of the desired character. This may be especially so with regard to the quantity cooling water and the volume of supporting air, since the temperature at the lips of the die may be different with different thermoplastic substances or compositions. Also the gauges (weight of the material to be supported) and its apparent resistance or cohesion will help to decide the air pressure needed. Hereinafter, is set forth illustrative thermoplastic materials which can be used in this invention, illustrative temperatures of the melt at the lips of the die being given as well as their thermal contraction:

| Material | Temperature of Melt at the die lips, °F. | Mold Shrinkage (SPI Handbook) |
| --- | --- | --- |
| Cellulose Acetate Butyrate | 220–380 | 0.003–0.009 |
| Cellulose Acetate (low Acetal) | 330–380 | 0.004–0.008 |
| Cellulose Acetate (high Acetal) | 450–550 | |
| Ethyl Cellulose | 400–420 | 0.004–0.006 |
| Methyl Methacrylate Polymer | 460–490 | 0.001–0.005 |
| Nylon (extrusion and molding grade) | 480–520 | 0.001 |
| Polystyrene | 450–490 | 0.002–0.008 |
| Polyvinyl formal-acetate butyral | 300–340 | 0.002–0.008 |
| Copolymers of vinyl chloride and vinyl acetate "Vinylite" | 270–370 | 0.002–0.010 |
| Polyvinyl chloride ("Geon," "Ultron") | 270–370 | 0.015–0.017 |
| Vinylidene chloride ("Saran") | 340–370 | 0.004–0.012 |

Though the results can be obtained when the temperature of the thermoplastic at the lips of the die is as given above, the temperature at the lips can be much higher and also lower than the figures given. The maximum temperature used will depend upon the thermoplastic being used, its stability to overheating, the length of time it is subjected to the high heat and its decomposition temperature.

The properties and stability of the thermoplastic substances can be modified as by incorporating therein suitable modifying agents, such as plasticizers, fillers, coloring agents, heat decomposition inhibitors, anti-oxidants, light stabilizers, etc.

The former is desirably constructed of a baffled conductive material such as stainless steel or copper, but is not restricted to them, and is desirably cooled by passing a coolant into and through it. The coolant can be any material capable of absorbing heat from the walls of the former and carrying this heat away with it as it is discharged from the former. For the purpose of test runs, water was used as it is cheap and available. The plastic tubing passing externally over the former will be cooled from the formative mastic state to a set condition. In order to accommodate the shrinkage which is brought about by the cooling action, the former is tapered from the top to the bottom, the bottom diameter being the desired predetermined diameter of the tubing. Since each thermoplastic material has an individual shrinkage factor, as well as other distinguishing factors which effect its drawing over the former, the taper of the former is predetermined for each material. In order to indicate that this shrinkage factor exists, a list of the published mold shrinkages of each thermoplastic has been given above.

The former position can be moved to a predetermined position, all depending upon the results desired from a predetermined thermoplastic and the desired predetermined diameter. The former position may be utilized very close to the die, even becoming a part thereof and being constructed therein as a part thereof.

The height of the former is not restricted to any dimension and may be constructed as small as a cooling coil. One or more formers may be used in series to obtain greater orientation and the temperatures in the formers may vary as desired. Thus a first former may be used at a somewhat higher (warmer) temperature than a second former and their diameters varied as desired. The last former will be the cold one, preceding formers not being cold enough to set the plastic. The length of the cooling former surface is determined by the nature of the material, the temperature of the material in the formative mastic state, the gauge, the speed, and whether it is desirable to draw above the former, on the former or below the former. This is determined by the required physical properties desired in the finished tubing, all of which are predetermined to produce a tubing with the required physical properties and the desired predetermined diameter. The cooling former gives a positive metering action on the tubing and being of positive nature as to diameter and support, permits the production of very fine gauge tubing and sheeting with excellent predetermined tolerance and desired diameter. Polythene has been produced at 0.000125" and vinyl chloride at 0.00025". These very fine tolerance gauge materials are the result of definite support, metering and controlled cooling obtained by the use of the temperature controlling former. The prior art method of using air pressure, without any positive support of the tubing walls, is not conducive to the production of low gauge or accuracy because, the formative plastic tubing will, tend to expand most easily at its thinnest point. Since by today's common standards, machining and heat controls are not accurate enough, the extruded tubing tends to have thin spots or overheated points, both of which will react the same under constant pressure, over-expansion of the tubing at those points will result which may blow-out, leaving holes, thus causing a loss of the head air. A complete collapse of the tube may result. This invention eliminates these difficulties because the film is supported and the air used is not for the expansion of the tube, but just as an assist in supporting the tubing as well as a partial coolant therefor and for the condensing of the volatile materials.

Likewise prior art methods of expanding the formative plastic tube by the use of a standing head of air have difficulty in maintaining a straight walled tube because of two factors; the first is mentioned above in reference to non-uniformity of wall thickness because of imperfect die machining and poor distribution of heat, resulting in thin spots that may expand further than expected; the second is the blow-out of the thin walled sections causing air loss or leakage. Small pin holes also affect the prior art methods causing a variation in the desired diameter of the tubing. Therefore any loss of air, regardless of the amount, in the prior art method of blowing or expanding the tubing while in the formative mastic state will decrease the diameter of the tubing; and since the air column is static, new air must be added to bring the air head back to its original amount before the desired predetermined diameter can be obtained.

My invention eliminates the hazards caused by the fixed column of air. The tubing while in the formative mastic state is supported by the air flow between the die and the cooling can. The tubing is supported while being drawn over the can; the tubing is supported and flattened by the spreader when in the set condition after which time no further expansion can take place. Since a continuous predetermined flow of air is established, the collapse of the tube never occurs. Regardless of pin-holes or blow-outs, my invention will provide a tube of the desired predetermined diameter. Also, no change is necessary in the air flow after the valve setting has been determined.

The spreader is of predetermined width and is correlated to the predetermined diameter of the cooling former in accordance with the desired predetermined diameter of the tubing.

The spreader may be a flat tapered object with a predetermined bottom width or may be constructed in many ways to accomplish the same purpose. It may be hollow cone; a structure formed from a metal tubing or framework and it may be rigid or spring loaded. Another feature not shown is of having a control, to expand or contract its width, which would originate above the die and go through the die in the air channel and proceed through the cooling former. Minute adjustments could then be made while the process is in operation or with large changes available the spreader could be used for more than one size cooling former.

The main object of the spreader is to deflate the tubing to a flat ribbon like structure, without wrinkles or trapped air, feeding the flat ribbon uniformly and accurately to the pull rolls which in turn feed the rewind rolls. The flattened tubing after leaving the spreader never loses contact with the pull rolls or the rewind rolls.

Because of the accuracy of the desired predetermined diameter of the tubing, which may be slit between the cooling former and the end of the spreader, the finished slit sheet or sheeting is predetermined and involves no trim, thereby maintaining an accuracy not herein before possible whether single sheets or multiples were made. Another feature of the spreader is that it can be so designed so that the tubing coming off the cooling former, the tubing being in the set state, may be gussetted. This is accomplished by structural changes in the spreader to accommodate the shape the tubing is to be given. The spreader may be of any shape: square, oval or any shape, regular or irregular, as long as the perimeter of such shape is equal to the perimeter of the flat spreader of predetermined width. The spreader may also be constructed so that it will be a multiple of the predetermined width, and additional assisting blades, rollers or other contrivances on the outside of the tubing to deflect the tubing into the apertures of the multiple widths.

In the examples, the volume and pressure of the internally supporting and separating air, the volume and temperature of the coolant in the former, the diameter of the cooling former, the diameter of the die, and the width and length of the spreader, are balanced against each other to produce tubing of the predetermined desired characteristics while all the other conditions, such as for example screw speed, temperature of extrusion, speed of rotating rolls, room temperature, width of die orifice, etc. are maintained constant. Obviously, if one or more of the conditions which is maintained constant in the examples is varied, the volume or pressure of the supporting and separating air, the diameter of the former, the diameter of the die, would have to be further balanced to compensate to accommodate for such variations. Such determinations of the necessary conditions may in accordance with the teachings of the instant invention, be determined by simple experiment. In general, however, since in any apparatus, certain features may be maintained constant, the four variables (internal supporting and separating air volume, cooling former diameter, diameter of the die, and the pull roll speed) are the most easily varied and controlled.

One of the features of this invention is the ease of producing various gauges of a thermoplastic compound of a desired predetermined diameter. When all the conditions for the proper production are accomplished, such as extrusion speed and temperatures, die temperatures, internal supporting and separating air volume and pressure, cooling former diameter and the spreader width, the gauge of the tubing of the desired predetermined diameter and physical properties can be varied by increasing or decreasing the speed of the pull rolls. The faster the speed, the lower the gauge and the slower the speed the higher the gauge.

The invention has been described in connection with a supporting and separating gaseous medium such as air. Since air is relatively cheap and available, it is preferred. However, any other gaseous medium which does not exert any deleterious effect upon the tubing being produced may be used.

In the invention, as herein before specifically described, water constituted the cooling medium for the cooling former. While tap water at 50° to 60° was generally used, and refrigerated water also used, because it was cheap and available, any other coolant whether liquid or gaseous may be used. It is possible that under certain conditions a coolant may be required at a higher temperature than normally supplied by commercial means. Therefore this invention is not limited in that respect and may provide a means for heating the coolant such as a hot water heater. In certain respects the lowering of the baffle inside the cooling former, a slower movement of the coolant, or a reversal of the flow of the coolant through the cooling former, will accomplish the desired higher temperature.

The invention herein described is particularly suitable for the production of very thin walled continuous walled tubing or sheeting. Though, as shown by the examples, tubing having a wall thickness of 0.002" may be produced, tubing having a wall thickness as low as 0.000125" and as high as 0.020" has also been produced.

In general the width of the die orifice is not material. It should be of a width to provide the molten material in sufficient amount to produce the predetermined sized tubing. A relationship between the die orifice diameter and the former diameter as great as 1:5 may be used, but the former diameter may also be smaller than the die orifice diameter.

The diameter of the die between the lips thereof is such that tubing in the formative mastic state may be drawn over the former of predetermined diameter.

Though the method has been herein described in connection with drawing the extruded tubing while in the formative mastic state to a diameter greater than the diameter of the die, the invention is not restricted thereto. The method may be utilized in the production of tubing of predetermined characteristics and of a diameter less than the diameter of the die. This may be obtained by utilizing a cooling former and a spreader of smaller diameter and width than the diameter of the die and increasing the speed of the pull rolls.

In the preferred embodiment of the invention, the tubing is extruded in a downward direction. Though this is the preferred embodiment, the principles of the invention can also be utilized for extruding horizontally, vertically upward or at any angle.

The invention provides a method whereby tubing of predetermined desired size, gauge, and physical characteristics may be obtained by appropriately controlling and regulating the variables in the process. Since in most of the apparatus most of the conditions may be maintained constant, the desired results may be obtained if all the conditions are maintained except the temperature of the cooling water, the diameter of the cooling former and the diameter of the die, and the width of the spreader, and such variables are balanced against each other while the other conditions are maintained constant as is necessary to produce the predetermined desired results.

All thermoplastics may be utilized in the present extrusion process. Polythene is relatively easy to extrude but vinyl and other plastics may be handled readily. Advantages of the present process over other known extrusion processes include:

(a) Air is blown in continuously and vented by its own pressure or received by a pump to move volatiles which cause tackiness and discoloration.

(b) To get constant dimension, the tube is supported throughout the process, the former acting as a metering device as well as for cooling.

(c) The former may be made electrically conducting to remove static thereby aiding later opening the tubing for packaging.

(d) Heat may be removed by a metal conductive former which is more rapid than prior art methods of air or water cooling, the latter presenting a problem of having a wet surface.

(e) The exactness of dimensions of the tubing permits slit sheeting to be produced without trimming or waste, all in one operation.

(f) Mechanics of spreader and rewind, permit rolls of any diameter to be produced without wrinkles or air bubbles and stretching.

(g) Lower gauges of tubing and film may be readily produced as the expansion of the tubing is positive with equal pressure on the entire inner surface of the tubing giving an equal transverse stretch, thereby removing the prior art difficulties resulting from excess blowing and stretching giving a relative thin wall or one spot slightly hotter than the rest of the tubing.

The products produced from the instant method may have lower gauge with good or better physical properties and may be made transparent, translucent or opaque as desired. Tears, holes, loss of air, etc., do not affect the continuous operation of the instant process whereas in the prior art they will cause a collapse of the tubing, pulsation giving varying widths, and loss of time due to starting all over again each time this occurs.

This process is simple and as far as I have ascertained is fool-proof in its operation.

Having thus set my invention, I claim:

1. In a method for extrusion of tubing and sheeting in which heated synthetic resinous thermoplastic tubing is die-extruded in non-self-sustaining condition and a fluid under pressure is supplied within said tubing to support said tubing, and which includes reducing said pressure in a reduced pressure zone to eliminate substantially any possibility of surge, and the pressure in the reduced pressure zone is balanced against a weight equal substantially to that of a Ping-pong ball, and in which the supporting fluid is circulated within the tubing to prevent its collapse, and the tubing is passed through a modifying and sizing zone to size and at least partially set the extruded tubing, and includes passing the tubing from the modifying and sizing zone into a sealing zone to seal the tubing against fluid passage in the direction of tubing travel and substantially to equalize the draw on the tubing around its entire periphery, the method which includes the further step of substantially equalizing the fluid pressure in the tubing between the sealing zone and the sizing zone with the pressure between the sizing zone and the point of extrusion.

2. In a method of producing flattened tubing and sheeting which includes extruding heated synthetic resinous thermoplastic seamless tubing in non-self-sustaining condition, circulating a supporting fluid under superatmospheric pressure within said tubing to prevent collapse, passing said tubing through a temperature modifying and sizing zone to size and at least partially set the extruded tubing, the improvements which include flowing the tubing in non-self-sustaining condition through the modifying and sizing zone in a changing arcuate direction of flow, said sizing zone being roughened to eliminate substantially any adhesion of tubing during sizing, passing the tubing from the modifying and sizing zone into a sealing zone to after-baffle and thus seal the tubing against fluid passage in the direction of tubing travel, and substantially to equalize the draw on the tubing around its entire periphery and equalizing substantially the fluid pressure in the tubing between the after baffle zone and the sizing zone with the fluid pressure in the tubing between the sizing zone and the point of extrusion.

3. The method as set forth in claim 2 in which the tubing after passing the after-baffle sealing zone is wound up in a freely revolving wind-up rolling operation to permit slippage and soft roll winding.

References Cited by the Examiner

UNITED STATES PATENTS

| | | | |
|---|---|---|---|
| 1,803,043 | 4/1931 | Valentine et al. | 242—66 |
| 1,828,888 | 10/1931 | Berry | 242—66 |
| 2,085,840 | 7/1937 | Walter | 264—209 |
| 2,581,242 | 1/1952 | Dickhaut | 242—65 |
| 2,668,324 | 2/1954 | Johnson | 18—14 |
| 2,688,773 | 9/1954 | McIntire | 264—95 |
| 2,720,680 | 10/1955 | Gerow | 264—209 |
| 2,876,497 | 3/1959 | Alexander | 264—209 |
| 2,925,621 | 2/1960 | Parth | 264—95 |
| 3,068,517 | 12/1962 | Blackmore | 18—14 |
| 3,084,386 | 4/1963 | Gerow | 264—209 |

ROBERT F. WHITE, *Primary Examiner.*

ALEXANDER H. BRODMERKEL, *Examiner.*

J. R. DUNCAN, A. R. NOE, *Assistant Examiners.*